3,287,356
DIHALOALKYLATION OF KETO STEROIDS

Glen E. Arth, Cranford, N.J., Alexander H. Todd, Cambridge, England, and Thomas B. Windholz, Westfield, N.J., assignors to Merck & Co., Inc., Rahway, N.J., a corporation of New Jersey
No Drawing. Filed Apr. 13, 1962, Ser. No. 187,221
14 Claims. (Cl. 260—239.55)

This invention relates to novel haloalkyl vinyl ether derivatives of keto steroids. More particularly, it is concerned with novel unsaturated difluoromethoxy steroids of the pregnane and androstane series and processes for preparing these compounds.

The haloalkyl vinyl ether derivatives of keto steroids of the pregnane series produced in accordance with the present invention possess high anti-inflammatory activity and are especially effective in the treatment of arthritis and related diseases, and can be administered for their cortisone-like action in extremely low dosage, thereby minimizing undesirable side effects. The corresponding haloalkyl vinyl ethers of the androstane series possess valuable androgenic and anti-hypercholesteremic activity.

It is an object of the present invention to provide a process for the haloalkylation of keto groups attached to a steroid ring where such keto groups are adjacent to a nuclear carbon atom having attached thereto anhydroxymethylene or carbomethoxy group. It is also an object of this invention to provide novel haloalkyl vinyl ethers of steroid compounds. These and other objects will be made apparent from the description which follows.

According to the present invention, it has now been found that steroids of the pregnane or androstane series which contain as part of the carbon chain of the nucleus the following partial structural formula:

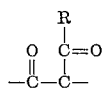

where R is hydrogen or lower alkoxy, may be treated with difluorochloromethane in an alkaline medium to produce a compound having the following partial structural formula:

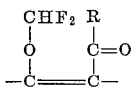

where R is as defined above. It will be understood by those skilled in the art that where a formyl starting material is employed, this formyl group is equivalent to an hydroxymethylene group since these two forms, i.e. HCHO and HO—CH=, when attached to the steroid nucleus, are in equilibrium. The end product in this case, however, will always be a formyl compound.

Any steroid compound possessing such a keto substituent adjacent to an hydroxymethylene or carbomethoxy substituent is suitable as a starting material for the process of the present invention. In addition, the nucleus may have other substituents attached thereto such as hydrogen, keto or hydroxyl at C–11, hydrogen or halogen at C–9, hydrogen or lower alkyl at C–16, keto, hydroxy or a dihydroxy acetone side chain at C–17, and the like. Also, the steroid nucleus may be unsaturated in various of the rings, particularly the A-ring. When steroids of the pregnane series are employed, it is preferred to use bis-alkylenedioxy groups to protect the C–17, C–20 and C–21 carbon atoms. For example, a 17α,20,20,21-bismethylenedioxy steroid may be prepared by reacting the corresponding 20-keto-17,21-dihydroxy steroid with formaldehyde in a known manner. Likewise, when 3-keto-Δ⁴-steroids of the androstene series are employed, it is preferred to protect the 3-keto group with a ketal protective group such as an ethylenedioxy group. These 3-ketal steroid compounds may readily be prepared by reacting the 3-keto starting material with, for example, ethylene glycol to form the corresponding 3-ethylenedioxy-Δ⁵-androstene. Upon completion of the difluoromethylation reaction the 3-keto-Δ⁴-androstene is readily regenerated by reaction with an organic acid such as p-toluenesulfonic acid in the presence of a suitable solvent, as for example, acetone.

The conversion of keto steroids to the corresponding difluoromethoxy compounds may, in accordance with the present process, conveniently be achieved by reacting the keto steroid starting material which is dissolved in a suitable organic solvent such as dimethoxyethane, tetrahydrofuran, dioxane or the like, with difluorochloromethane in the presence of an alkali such as sodium-t-butoxide or potassium-t-butoxide at room temperature for a period of from about 10 to 20 hours. The resulting difluoromethoxy steroid is then readily recovered by adding water to the reaction mixture and extracting the resulting solution with a suitable solvent such as ethyl acetate, followed by crystallization from a solvent in which the compound is insoluble, as, for example, ether. Although it is not essential to the course of the reaction, it has been found that the yields of steroid product are enhanced when the reaction is carried out under anhydrous conditions, so that suitable precautions should be taken to dry adequately each of the reactants prior to its use. The sodium or potassium-t-butoxide employed in this process, may, if desired, be formed in situ by the addition of sodium or potassium hydride and t-butanol to the reaction mixture. Advantageously, this is done prior to the introduction of the difluorochloromethane which is added preferably by bubbling this gas into the reaction mixture.

The steroids which may be employed as starting materials include such compounds as 16-carbomethoxyandrostane-3β-ol-17-one;
16-carbomethoxy-3-ethylenedioxy-5-androstene-17-one;
17α,20,20,21-bismethylenedioxy-2-carbomethoxy-4-pregnene-3,11-dione;
17α,20,20,21-bismethylenedioxy-2-hydroxymethylene-4-pregnene-3,11-dione;
17α,20,20,21-bismethylenedioxy-2-carbomethoxy-9α-fluoro-16α-methyl-4-pregnene-3,11-dione
and the like.

When the above starting materials are treated with difluorochloromethane in accordance with the present process, the corresponding difluoromethoxy compounds are formed, as for example, 16-carbomethoxy-17-difluoromethoxy-16-androstene-3β-ol;
16-carbomethoxy-17-difluoromethoxy-4,16-androstadiene-3-one;
17α,20,20,21-bismethylenedioxy-2-carbomethoxy-3-difluoromethoxy-2,4-pregnadiene-11-one;
17α,20,20,21-bismethylenedioxy-2-formyl-3-difluoromethoxy-2,4-pregnadiene-11-one;
17α,20,20,21-bismethylenedioxy-2-carbomethoxy-3-difluoromethoxy-9α-fluoro-16α-methyl-2,4-pregnadiene-11-one
and the like.

The resulting 17α,20,20,21-bismethylenedioxy compounds may, if desired, be further converted to the corresponding 20-keto-17α,21-free alcohol steroid compound by treating these bismethylenedioxy compounds in a known manner with a strong acid such as formic acid, or the like, thereby removing the bismethylenedioxy groups.

The following examples illustrate methods of carrying out the present invention, but it is to be understood that these examples are given for purposes of illustration and not of limitation.

Example 1

1.06 gm. of 17α,20,20,21-bismethylenedioxy-2-hydroxymethylene-4-pregnene-3,11-dione is dissolved in 70 ml. dry tetrahydrofuran in a 250 ml. two-necked flask fitted with a drying tube and a gas inlet. The solution is stirred magnetically, and the flask is placed in an ice-bath at 0° C. 1.27 gm. of 54% potassium hydride is added, and then 2.5 ml. dry t-butyl alcohol. Diflurochloromethane, dried by passing through a $CaCl_2$ tower, is passed into the mixture for 4 hours at a slow rate, with stirring at 0° C. At the end of the 4 hours, the difluorochloromethane supply is cut off, and the flask allowed to attain room temperature overnight.

The contents of the flask are then poured into water, and the aqueous solution extracted with ethyl acetate. The organic layer is separated, washed three times with water, and dried over sodium sulfate. The solvent is evaporated, and the solid separating dried under high vacuum. The solid is treated with ether, whereupon white crystalline compounds separates. This is washed several times with ether, until the supernatant liquid is colorless, and then dried. The compound is recrystallized from chloroform-ether mixtures, and from methanol, yielding colorless elongated prisms of 17α,20,20,21-bismethylenedioxy - 2 - formyl-3-difluoromethoxy-2,4-pregnadiene-11-one.

Example 2

1.06 gm. of 17α,20,20,21-bismethylenedioxy-2-carbomethoxy-4-pregnene-3,11-dione is dissolved in 70 ml. dry dimethoxyethane in a 250 ml. two-necked flask fitted with a drying tube and a gas inlet. The solution is stirred magnetically, and the flask is placed in an ice-bath at 0° C. 1.27 gm. of 54% sodium hydride is added, and then 2.5 ml. dry t-butyl alcohol. Difluorochloromethane, dried by passing through a $CaCl_2$ tower, is passed into the mixture for 4 hours at a slow rate, with stirring at 0° C. At the end of the 4 hours, the difluorochloromethane supply is cut off, and the flask allowed to attain room temperature overnight.

The contents of the flask are then poured into water, and the aqueous solution extracted with ethyl acetate. The organic layer is separated, washed three times with water, and dried over sodium sulfate. The solvent is evaporated, and the solid separating dried under high vacuum. The solid is treated with ether, whereupon a white crystalline compound separates. This is washed several times with ether, until the supernatant liquid is colorless, and then dried. The compound is recrystallized from chloroform-ether mixtures, and from methanol, yielding colorless elongated prisms of 17α,20,20,21-bismethylenedioxy - 2 - carbomethyl-3 - difluoromethoxy-2,4-pregnadiene-11-one.

Example 3

1.06 gm. of 17α,20,20,21-bismethylenedioxy-2-carbomethoxy-9α-fluoro-16α-methyl-4-pregnene-3,11 - dione is dissolved in 70 ml. dry dioxolane in a 250 ml. two-necked flask fitted with a drying tube and a gas inlet. The solution is stirred magnetically, and the flask is placed in an ice-bath at 0° C. 1.27 gm. of 54% sodium hydride is added, and then 2.5 ml. dry t-butyl alcohol. Difluorochloromethane, dried by passing through a $CaCl_2$ tower, is passed into the mixture for 4 hours at a slow rate, with stirring at 0° C. At the end of the 4 hours, the difluorochloromethane supply is cut off, and the flask allowed to attain room temperature overnight.

The contents of flask are then poured into water, and the aqueous solution extracted with ethyl acetate. The organic layer is separated, washed three times with water, and dried over sodium sulfate. The solvent is evaporated, and the solid separating dried under high vacuum. The solid is treated with ether, whereupon white crystalline compound separates. This is washed several times with ether, until the supernatant liquid is colorless, and then dried. The compound is recrystallized from chloroform-ether mixtures, and from methanol, yielding colorless elongated prisms of 17α,20,20,21-bismethylenedioxy-2 - carbomethoxy-3-difluoromethoxy-9α-fluoro-16α-methyl-2,4-pregnadiene-11-one.

Example 4

1.06 gm. of 16-carbomethoxy-androstane-3β-ol-17-one is dissolved in 70 ml. dry tetrahydrofuran in a 250 ml. two-necked flask fitted with a drying tube and a gas inlet. The solution is stirred magnetically, and the flask is placed in an ice-bath at 0° C. 1.27 gm. of 54% sodium hydride is added, and then 2.5 ml. dry t-butyl alcohol. Difluorochloromethane, dried by passing through a $CaCl_2$ tower, is passed into the mixture for 4 hours at a slow rate, with stirring at 0° C. At the end of the 4 hours, the difluorochloromethane supply is cut off, and the flask allowed to attain room temperature overnight.

The contents of the flask are then poured into water, and the aqueous solution extracted with ethyl acetate. The organic layer is separated, washed three times with water, and dried over sodium sulfate. The solvent is evaporated, and the solid separating dried under high vacuum. The solid is treated with ether, whereupon white crystalline compound separates. This is washed several times with ether, until the supernatant liquid is colorless, and then dried. The compound is recrystallized from chloroform-ether mixtures, and from methanol, yielding colorless elongated prisms of 16-carbomethoxy-17-difluoromethoxy-16-androstene-3β-ol.

Example 5

1.06 gm. of 16-carbomethoxy-3-ethylenedioxy-5-androstene-17-one is dissolved in 70 ml. dry dioxolane in a 250 ml. two-necked flask fitted with a drying tube and a gas inlet. The solution is stirred magnetically, and the flask is placed in an ice-bath at 0° C. 1.27 gm. of 54% potassium hydride is added, and then 2.5 ml. dry t-butyl alcohol. Difluorochloromethane, dried by passing through a $CaCl_2$ tower, is passed into the mixture for 4 hours at a slow rate, with stirring at 0° C. At the end of the 4 hours, the difluorochloromethane supply is cut off, and the flask allowed to attain room temperature over night.

The contents of the flask are then poured into water, and the aqueous solution extracted with ethyl acetate. The organic layer is separated, washed three times with water, and dried over sodium sulfate. The solvent is evaporated, and the solid separating dried under high vacuum. The solid is treated with ether, whereupon white crystalline compound separates. This is washed several times with ether, until the supernatant liquid is colorless, and then dried. The compound is recrystallized from chloroform-ether mixtures, and from methanol, yielding colorless elongated prisms of 16-carbomethoxy-17-difluoromethoxy-3-ethylenedioxy-5,16-androstadiene.

Seventy-three milligrams of 16 carbomethoxy-17-difluoromethoxy-3-ethylenedioxy-5,16-androstadiene is dissolved in 4 cc. of acetone, and 5 mg. of p-toluenesulfonic acid monohydrate in 1 cc. of acetone is added. The solution is allowed to stand overnight at room temperature. It is then diluted with water and extracted three times with ether. The combined ether extracts are washed with water, dried and concentrated in vacuo. The residue is chromatographed over acid-washed alumina and eluted with mixtures of chloroform and ether. Recrystallization from a mixture of methylene chloride and ether afford 16-carbomethoxy-17-difluoromethoxy-4,16 - androstadiene-3-one.

Example 6

A slurry of 970 mg. of 17α,20,20,21-bismethylenedioxy-2-carbomethoxy-3 - difluoromethoxy - 2,4-pregnadiene-11-one in 97 ml. of 60% formic acid is purged six times with nitrogen and then heated at 93–95° C. for 15 minutes under nitrogen. The solution is cooled in an ice bath and then 100 ml. of water is added. About 20 gms. of sodium carbonate is added portionwise and the resulting precipitate is extracted with chloroform. The chloroform solution is washed acid free with saturated sodium bicarbonate solution and then is washed with water. The chloroform is removed in vacuo and the residue is flushed with 20 ml. of methanol and then concentrated in vacuo to dryness. The crude product at this point contains approximately 10–15% of the 21-formate.

The crude product is dissolved in 45 ml. of purified methanol and purged 6 times with nitrogen. After adding 1.43 ml. of 0.21 M sodium methoxide in methanol (about 12% of theory), the solution is stirred for 7 minutes at 20–25° C. under nitrogen. The solution is then acidified with 3–4 drops of acetic acid. 5 ml. of water and 500 mg. of activated carbon (Darco G–60) are then added and the mixture is stirred at room temperature for 20 minutes. After filtering off the carbon, 40 ml. of water is added and the solution is concentrated in vacuo until essentially no methanol is present. The residual material is filtered, again, dried and crystallized from ethyl acetate to give 2 - carbomethoxy-3-difluoromethoxy-$17\alpha$,21 - dihydroxy-2,4-pregnadiene-11,20-dione.

In accordance with the foregoing procedures but starting with $17\alpha$,20,20,21-bismethylenedioxy-2-formyl-3-difluoromethoxy-2,4-pregnadiene-11-one there is obtained the corresponding 2-formyl-3-difluoromethoxy-$17\alpha$,21-dihydroxy-2,4-pregnadiene-11,20-dione.

In accordance with the foregoing procedures but starting with $17\alpha$,20,20,21-bismethylenedioxy-2-carbomethoxy-3-difluoromethoxy-$9\alpha$-fluoro-$16\alpha$-methyl-2,4 - pregnadiene-11-one there is obtained the corresponding 2-carbomethoxy-3-difluoromethoxy-$9\alpha$ - fluoro - $16\alpha$ - methyl-$17\alpha$,21-dihydroxy-2,4-pregnadiene-11,20-dione.

The 2 - hydroxymethylene-cortisone-bismethylenedioxy compound employed as the starting material in Example 1 may be prepared as follows:

To a suspension of 25.0 g. of $17\alpha$,21-dihydroxy-4-pregnene-3,11,20-trione in 1.5 liters of alcohol-free chloroform cooled to about 5° C. in an ice bath is added with constant stirring 750 ml. of cold, concentrated hydrochloric acid and then 750 ml. of formalin (low in methanol). The mixture is removed from the ice bath and stirred at room temperature for 7 hours. The layers are separated and the aqueous phase is back-extracted twice with chloroform. The combined organic layers are washed twice with a 5% solution of sodium bicarbonate, and twice with a saturated salt solution. The solution is dried over magnesium sulfate and evaporated to dryness under reduced pressure. The residue is triturated with methanol to afford a crystalline solid. This material contains no detectable amount of starting material by paper-strip chromatography but shows two U.V. absorbing spots near the solvent front (methanol-formamide 2:1 vs. benzene-n-hexane 1:1). A 2.425 g. aliquot is recrystallized three times from a mixture of benzene and n-hexane to give 1.350 g. of $17\alpha$,20,20,21-bismethylenedioxy-4-pregnene-3,11-dione, which is used in the subsequent step of the synthesis without further purification.

The $17\alpha$,20,20,21-bismethylenedioxy-4-pregnene-3,11-dione (1.350 g.) is dissolved in 23 ml. of dry, hot benzene and the resulting solution is cooled to room temperature and treated with 0.96 ml. of freshly distilled ethyl formate. The air in the system is replaced with nitrogen and 560 mg. of sodium hydride (as a 58% dispersion in mineral oil) is added. The system is again evacuated and filled with nitrogen, and the mixture is stirred magnetically at room temperature overnight. The mixture is poured into an excess of a saturated aqueous solution of sodium dihydrogen phosphate and the product is extracted four times with benzene. The organic extracts are washed three three times with water and dried over sodium sulfate. Removal of the solvent gives the crude product which is dissolved in ether and purified as the sodium salt by extraction into a 10% solution of sodium carbonate. The aqueous alkaline extracts are again acidified with an excess of a saturated aqueous solution of sodium dihydrogen phosphate and extracted into ether and into chloroform. The combined organic extracts are dried over sodium sulfate and evaporated to dryness to give $17\alpha$,20,20,21-bismethylenedioxy - 2 - hydroxymethylene-4-pregnene-3,11-dione.

The 2-carbomethoxy steroids employed as the starting materials in Examples 2 and 3 may be prepared as follows:

500 mg. of cortisone is suspended in 40 ml. of chloroform and 10 ml. of formalin (40% aqueous formaldehyde) and 10 ml. of concentrated hydrochloric acid are added. This two-phase system is stirred vigorously at room temperature for 52 hours. The aqueous phase is then made alkaline with aqueous sodium hydroxide, separated and extracted twice with chloroform. After washing with sodium bisulfite solution the chloroform is evaporated to give 685 mg. of crystalline residue. After recrystallization from acetone and methanol, $17\alpha$,20,20,21-bismethylenedioxy-4-pregnene-3,11-dione is obtained.

5 ml. of 2 N sodium methoxide is evaporated to dryness in vacuo at 100° C. and 25 ml. of dry benzene is added thereto. To the mixture is added one gram of $17\alpha$,20,20,21 - bismethylenedioxy - 4-pregnene-3,11-dione and two grams of dimethyl oxalate, and the resulting mixture is stirred at room temperature for 16 hours. Chloroform, and an excess of an aqueous solution of sodium dihydrogen phosphate, are added to the reaction mixture, the chloroform layer is separated, and the aqueous layer is extracted with additional chloroform. The combined chloroform extracts are washed with water, dried, and evaporated to dryness under high vacuum thereby removing excess dimethyl oxalate. The residual material is dissolved in methylene chloride, and the methylene chloride solution is shaken with 20 ml. of cold 1% aqueous potassium hydroxide solution; the aqueous alkaline layer is rapidly withdrawn and acidified with 20 ml. of cold 0.1 N aqueous sulfuric acid solution and excess sodium dihydrogen phosphate. The resulting slurry is extracted with chloroform, and the chloroform extract is dried and evaporated to dryness. The residual material is recrystallized from ethyl acetate to give substantially pure $17\alpha$,20,20,21-bismethylenedioxy - 2 - methoxalyl-4-pregnene-3,11-dione.

1 gm. of $17\alpha$,20,20,21-bismethylenedioxy-2-methoxalyl-4-pregnene-3,11-dione is mixed intimately with 2 gm. powdered glass and placed in a 50 ml. round-bottomed flask, and connected to a vacuum system. The flask is placed in an oil bath maintained at 200–210° C. When the whole of the solid has melted, the flask is left in the oil-bath and further 5 minutes, until bubbles of gas have practically ceased to appear. It is then removed from the oil-bath and allowed to cool and regain atmospheric pressure.

The solid is extracted with benzene, and the benzene solution antrifuged to remove the glass. The glass is washed 4 times with benzene, and the washings combined with the main extract.

The benzene solution is placed on a column of 100 gm. silica gel, and eluted with benzene until the eluent is clear. (A brown tar is eluted in the benzene.) The column is then eluted with 90% benzene/10% ethyl acetate mixture, yielding a white or pale yellow solid. This is dissolved in small quantity of chloroform and ether added. White crystals separate which are washed with ether until the supernatant liquid is colorless, and dried.

The compound may be recrystallized from chloroform-ether mixture and from acetone-petroleum ether mixture, yielding colorless crystals of $17\alpha$,20,20,21-bismethylenedioxy-2-carbomethoxy-4-pregnene-3,11-dione.

In accordance with the foregoing procedures, but substituting $9\alpha$ - fluoro-$16\alpha$-methyl-$17\alpha$,21-dihydroxy-4-pregnene-3,11,20-trione for cortisone, there is obtained the corresponding $17\alpha$,20,20,21 - bismethylenedioxy-2-carbomethoxy - $9\alpha$ - fluoro - $16\alpha$-methyl-4-pregnene-3,11-dione starting material.

The 16-carbomethoxy-3-ethylenedioxy-5-androstene-17-one starting material employed in Example 5 may be prepared as follows, starting with the known 3-ethylenedioxy-17β-hydroxy-5-androstene:

To a chilled solution of 1.64 g. of 3-ethylenedioxy-17β-hydroxy-5-androstene in 15 cc. of dry pyridine is added the chromic oxide-pyridine reagent prepared from 2.06 g. of chromic oxide and 15 cc. of pyridine. The stirred mixture is kept at room temperature overnight and is then added to 100 cc. of ice water. Chloroform is added and the mixture is filtered through diatomaceous earth. The precipitate is washed with more chloroform and the layers of the filtrate are separated. The chloroform phase is washed with water, and is dried and partially decolorized over magnesium sulfate and activated charcoal. The solution is filtered and freed from solvents by evaporation. The residue is crystallized from methanol to afford 3-ethylenedioxy-5-androstene-17-one.

Sodium (75 mg.) is dissolved with heating in a mixture of 30 cc. of benzene and 2 cc. of methanol. Solvent is distilled from the stirred mixture until the distillation temperature reaches 80° C. To the resulting stirred suspension, cooled to room temperature, is added 1 g. of 3-ethylenedioxy-5-androstene-17-one and 1 cc. of methyl oxalate. The mixture is stirred at room temperature for 16 hours and is then extracted with several portions of 1% aqueous potassium hydroxide solution. The extracts are neutralized with 30% aqueous sodium dihydrogen phosphate solution and the mixture is extracted several times with chloroform. The combined chloroform extracts are washed with water, dried, and evaporated. The residue is crystallized from ether to afford 16-methoxalyl-3-ethylenedioxy-5-androstene-17-one.

1 gram of 16-methoxalyl-3-ethylenedioxy-5-androstene-17-one is mixed intimately with 2 gm. powdered glass and placed in a 50 ml. round bottomed flask, and connected to a vacuum system. The flask is placed in an oil both maintained at 200–210° C. When the whole of the solid has melted, the flask is left in the oil bath a further 5 minutes, until bubbles of gas have practically ceased to appear. It is then removed from the oil bath and allowed to cool and regain atmospheric pressure.

The solid is extracted with benzene, and the benzene solution centrifuged to remove the glass. The glass is washed 4 times with benzene, and the washings combined with the main extract.

The benzene solution is placed on a column of 100 gm. silica gel, and eluted with benzene until the eluent is clear. (A brown tar is eluted in the benzene.) The column is then eluted with 90% benzene/10% ethyl acetate mixture, yielding a white or pale yellow solid. This is dissolved in a small quantity of chloroform and ether added. White crystals separate which are washed with ether until the supernatant liquid is colorless, and dried.

The compound may be recrystallized from chloroform-ether mixture and from acetone-petroleum ether mixture, yielding colorless crystals of 16-carbomethoxy-3-ethylenedioxy-5-androstene-17-one.

The 16-carbomethoxy androstane-3β-ol-17-one starting material employed in Example 4 may be prepared as follows, starting with the known androstane-3β-ol-17-one:

Sodium (75 mg.) is dissolved with heating in a mixture of 30 cc. of benzene and 2 cc. of methanol. Solvent is distilled from the stirred mixture until the distillation temperature reaches 80° C. To the resulting stirred suspension, cooled to room temperature, is added 1 g. of androstane-3β-ol-17-one and 1 cc. of methyl oxalate. The mixture is stirred at room temperature for 16 hours and is then extracted with several portions of 1% aqueous potassium hydroxide solution. The extracts are neutralized with 30% aqueous sodium dihydrogen phosphate solution and the mixture is extracted several times with chloroform. The combined chloroform extracts are washed with water, dried, and evaporated. The residue is crystallized from ether to afford 16-methoxalyl-androstane-3β-ol-17-one.

1 gram of 16-methoxalyl-androstane-3β-ol-17-one is mixed intimately with 2 gm. powdered glass and placed in a 50 ml. round bottomed flask, and connected to a vacuum system. The flask is placed in an oil bath maintained at 200–210° C. When the whole of the solid has melted, the flask is left in the oil bath and further 5 minutes, until bubbles of gas have practically ceased to appear. It is then removed from the oil bath and allowed to cool and regain atmospheric pressure.

The solid is extracted with benzene, and the benzene solution antrifuged to remove the glass. The glass is washed 4 times with benzene, and the washings combined with the main extract.

The benzene solution is placed on a column of 100 gm. silica gel, and eluted with benzene until the eluent is clear. The column is then eluted with 90% benzene/10% ethyl acetate mixture, yielding a white solid. This is dissolved in small quantity of chloroform and ether added. White crystals separate which are washed with ether until the supernatant liquid is colorless, and dried.

The compound may be recrystallized from chloroform-ether mixture and from acetone-petroleum ether mixture, yielding crystals of 16-carbomethoxyandrostane-3β-ol-17-one.

Various changes and modifications may be made in carrying out the present invention without departing from the spirit and scope thereof. Insofar as these changes and modifications are within the purview of the annexed claims, they are to be considered as part of our invention.

We claim:
1. 17α,20,20,21 - bismethylenedioxy - 2 - formyl-3-difluoromethoxy-2,4-pregnadiene-11-one.
2. 17α,20,20,21 - bismethylenedioxy - 2-carbomethoxy-3-difluoromethoxy-2,4-pregnadiene-11-one.
3. 17α,20,20,21 - bismethylenedioxy-2-carbomethoxy-3 - difluoromethoxy - 9α - fluoro-16α-methyl-2,4-pregnadiene-11-one.
4. 2 - carbomethoxy - 3 - difluoromethoxy-17α,21-dihydroxy-2,4-pregnadiene-11,20-dione.
5. 2 - formyl - 3 - difluoromethoxy-17α,21-dihydroxy-2,4-pregnadiene-11,20-dione.
6. 2 - carbomethoxy - 3 - difluoromethoxy - 9α-fluoro-16α - methyl - 17α,21 - dihydroxy-2,4-pregnadiene-11,20-dione.
7. 16 - carbomethoxy - 17 - difluoromethoxy-16-androstene-3β-ol.
8. 16 - carbomethoxy - 17-difluoromethoxy-4,16-androstadiene-3-one.
9. The process which comprises reacting a compound having the formula:

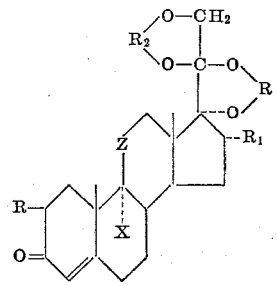

wherein R is selected from the group consisting of formyl and carbomethoxy, $R_1$ is selected from the group consisting of lower alkyl and hydrogen, $R_2$ is lower alkyl, Z is selected from the group consisting of $>R=O$ and

and X is selected from the group consisting of hydrogen and fluorine, with difluorochloromethane in an alkaline medium to form the corresponding difluoromethoxy compound having the formula:

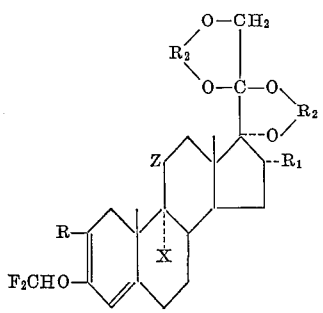

wherein R, $R_1$, $R_2$, Z and X are as defined above.

10. The process which comprises reacting a compound having the formula:

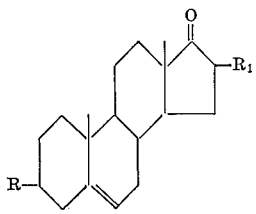

wherein R is a ketal group, $R_1$ is selected from the group consisting of formyl and carbomethoxy, with the difluorochloromethane in an alkaline medium to produce a compound having the formula:

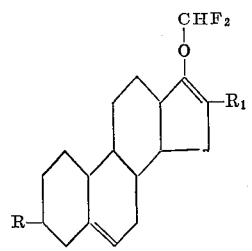

wherein R, $R_1$ are as above.

11. The process which comprises reacting $17\alpha,20,20,21$-bismethylenedioxy - 2-hydroxymethylene-4-pregnene-3,11-dione with difluorochloromethane in the presence of tetrahydrofuran and potassium-t-butoxide to produce $17\alpha,20,20,21$ - bismethylenedioxy - 2 - formyl-3-difluoromethoxy-2,4-pregnadiene-11-one.

12. The process according to claim 11 wherein the reaction is carried out under essentially anhydrous conditions.

13. The process which comprises reacting $17\alpha,20,20,21$-bismethylenedioxy - 2 - carbomethoxy - 4 - pregnene-3,11-dione with difluorochloromethane in the presence of dimethoxy-ethane and sodium-t-butoxide to produce the corresponding $17\alpha,20,20,21$ - bismethylenedioxy - 2 - carbomethoxy-3-difluoromethoxy-2,4-pregnadiene-11-one.

14. The process according to claim 13 wherein the reaction is carried out under essentially anhydrous conditions.

No references cited.

LEWIS GOTTS, Primary Examiner.

E. ROBERTS, Assistant Examiner.